United States Patent [19]
Date et al.

[11] Patent Number: 5,327,193
[45] Date of Patent: Jul. 5, 1994

[54] EXPOSURE DEVICE HAVING AN ACTUATABLE SHUTTER RELEASE

[75] Inventors: Nobuaki Date; Shohei Takeda, both of Kanagawa, Japan

[73] Assignee: Canon Kabushiki Kaisha, Tokyo, Japan

[21] Appl. No.: 909,118

[22] Filed: Jul. 6, 1992

Related U.S. Application Data

[63] Continuation of Ser. No. 692,815, Apr. 25, 1991, abandoned, which is a continuation of Ser. No. 336,047, Apr. 11, 1989, abandoned.

[30] Foreign Application Priority Data

Apr. 15, 1988 [JP] Japan .................. 63-092935
Jun. 7, 1988 [JP] Japan .................. 63-139620
Jun. 7, 1988 [JP] Japan .................. 63-139621

[51] Int. Cl.$^5$ ..................... G03B 7/097; H04N 5/238
[52] U.S. Cl. .................... 354/435; 348/363; 348/367
[58] Field of Search ............... 354/435–440, 354/228, 230, 231, 245, 246, 247, 274, 209; 358/213.19, 225, 228

[56] References Cited

U.S. PATENT DOCUMENTS

| 4,206,987 | 6/1980 | Sunouchi et al. ............ 354/448 |
| 4,500,185 | 2/1985 | Haraguchi et al. ........... 354/209 |
| 4,527,876 | 7/1985 | Tanaka et al. ............... 354/229 |
| 4,534,638 | 8/1985 | Hirohata et al. ............. 354/440 |
| 4,676,624 | 6/1987 | Kiuchi et al. ................ 354/209 |
| 4,734,777 | 3/1988 | Okino et al. ................. 358/228 |
| 4,918,481 | 4/1990 | Yasukawa et al. .......... 354/412 |
| 5,036,400 | 7/1991 | Haruki et al. ................ 358/228 |
| 5,115,319 | 5/1992 | Arai et al. .................... 358/228 |
| 5,189,519 | 2/1993 | Miyamoto et al. .......... 358/228 |
| 5,194,960 | 3/1993 | Ota .............................. 358/228 |

Primary Examiner—W. B. Perkey
Attorney, Agent, or Firm—Robin, Blecker, Daley & Driscoll

[57] ABSTRACT

An exposure device with a shutter operating in such a manner that the size of aperture opening defined by the shutter blades first increases from zero and then starts to decrease in predetermined timing, comprises a mechanism for opening the shutter with the help of an electric motor, while charging a spring as the drive source for closing movement of the shutter, an electromagnet arranged upon current supply to change the driving of the shutter from the opening mechanism to the spring, and a control circuit for controlling the operation of the shutter in such a manner that when taking one picture, the shutter blades reciprocate two times continuously to recycle substantially twice the exposure operation, as the operation of each of the motor and the electromagnet is recycled twice.

14 Claims, 10 Drawing Sheets

EXPOSURE DEVICE HAVING AN ACTUATABLE SHUTTER RELEASE

This is a continuation application under 37 CRF 1.62 of prior application Ser. No. 692,815, filed Apr. 25, 1991, abandoned, which is a continuation of prior application Ser. No. 336,047 filed Apr. 15, 1989, abandoned.

BACKGROUND OF THE INVENTION

1. Field of the Invention

This invention relates to exposure devices for use in optical instruments such as cameras or observation instruments.

2. Description of the Related Art

For ordinary cameras, the exposure device such as shutter and diaphragm to be used therein is available in many forms corresponding to the photographic characteristics or the like. Yet, no exposure device suited to the still video camera which necessitates far higher an accuracy of exposure control has been developed.

Of the conventional, publicly known exposure devices, what is so-called a diaphragm-cum-shutter has features adaptable to be used in the still video camera. But, the conventional, publicly known diaphragm-cum-shutter, because of its having the following drawback, has been difficult to use in the still video camera.

Most of the conventional diaphragm-cum-shutters are constructed with the use of a sub-diaphragm arranged in front of the light receiving element to open and close at the same time when the diaphragm of the photographic lens opens and closes, that is, in the form of a diaphragm-cum-shutter with sub-diaphragm. In operating this diaphragm-cum-shutter with sub-diaphragm, as an exposure operation goes on, at the same time that the diaphragm is opened, the sub-diaphragm also is opened. Since the sub-diaphragm has been opened, light enters the photosensitive element arranged behind the sub-diaphragm. The light that has entered the photosensitive element is integrated to a value which is detected as an amount of light incident on the image sensing plane. When that integrated value has reached a predetermined value (the exposure value determined depending on the result of light measurement), a current is supplied to an electromagnet for controlling the closing operation of the diaphragm. Thus, the diaphragm is closed.

This publicly known diaphragm-cum-shutter with sub-diaphragm has the feature that in the photographic situation where the brightness is so high that the diaphragm should be opened to a minimum aperture, even if, soon after the light having passed through the sub-diaphragm has entered the photosensitive element, the diaphragm closing signal is output to the electromagnet, the diaphragm, because of the response delay of the electromagnet, cannot immediately close and, therefore, an over-exposure always results.

Meanwhile, for the photographic situation of middle brightness level where the diaphragm does not fully open, the ratio of the amount of exposure during the opening operation of the diaphragm to the amount of exposure during the closing operation of the diaphragm is almost constant, permitting premature production of the diaphragm closing signal to the electromagnet by previously estimating the amount of exposure to be made during the closing operation of the diaphragm. Therefore, good linearity of exposure control can be assured. This leads to the possibility of controlling the exposure with very high accuracy.

However, for a photographic situation of lower brightness level than that at which the diaphragm fully opens, because the ratio of the exposure integrated until the diaphragm closing signal is given to the electromagnet to the exposure integrated during the closing operation of the diaphragm does not become constant, the amount of exposure during the closing operation of the diaphragm cannot previously be estimated. Hence, there are many occasions that an under-exposure or over-exposure is caused to make.

As a result, with the publicly known diaphragm-cum-shutter with sub-diaphragm, the exposure cannot be controlled in linear manner over the entire range of the high brightness region, the middle brightness region and the low brightness region. Therefore, fluctuations take place in the exposure value over the aforesaid three regions. For this reason, the publicly known diaphragm-cum-shutter with sub-diaphragm could not be used as the exposure device for the camera which requires high accuracy of exposure such as the still video camera.

So, to remove the above-described drawback of the publicly known diaphragm-cum-shutter with sub-diaphragm, use of an encoder for detecting the amount of movement of the diaphragm, or a diaphragm-cum-shutter with encoder, is proposed. This diaphragm-cum-shutter with encoder is arranged so that the amount of movement, or the position, of the diaphragm is detected by the encoder to determine what position the diaphragm takes or what size the exposure aperture has, at every one time unit, thereby giving an advantage that in best timing based on that result, the diaphragm closing signal can be applied to the electromagnet.

However, this diaphragm-cum-shutter with encoder, too, because of the following reason, is not suited to perform a highly accurate exposure control. In more detail, the running characteristic of the diaphragm at the time of the opening operation varies with environment such as temperature, humidity, the lattitude, aging variation, of the diaphragm, etc. Therefore, while the amount of opening movement, or the position, of the diaphragm can be determined, the running characteristics (the speed and acceleration at any given moment) of the diaphragm are left unknown. Hence, however accurate the detection of the amount of opening movement, or the position, of the diaphragm may be, the position, or the time at which the diaphragm starts to close cannot accurately be controlled. Also, in a case where a motor or like drive source is used as arranged to give the diaphragm a movement controlled in the opening direction, the variation of the drive voltage of the motor, the variation of the resistance value of the motor coil due to the elevation of the motor temperature by the current supply, and other factors cause the running characteristics of the diaphragm to vary. Therefore, even if the amount of opening movement, or the position, of the diaphragm has accurately been detected by the encoder, the position at which the diaphragm starts to close cannot accurately be controlled, because the running characteristics of the diaphragm are not detected. Hence, in the case using the encoder in determining the position of the diaphragm at a time during the opening operation of the diaphragm so that based on this determined value, the electromagnet is actuated to close the diaphragm, for fast and slow opening speeds of the diaphragm, even though their values determined by the encoder are equal to each other, the positions at which the diaphragm starts to close differ from each other. Therefore, the exposure times and the exposure quantities are caused to differ.

Figure 5:
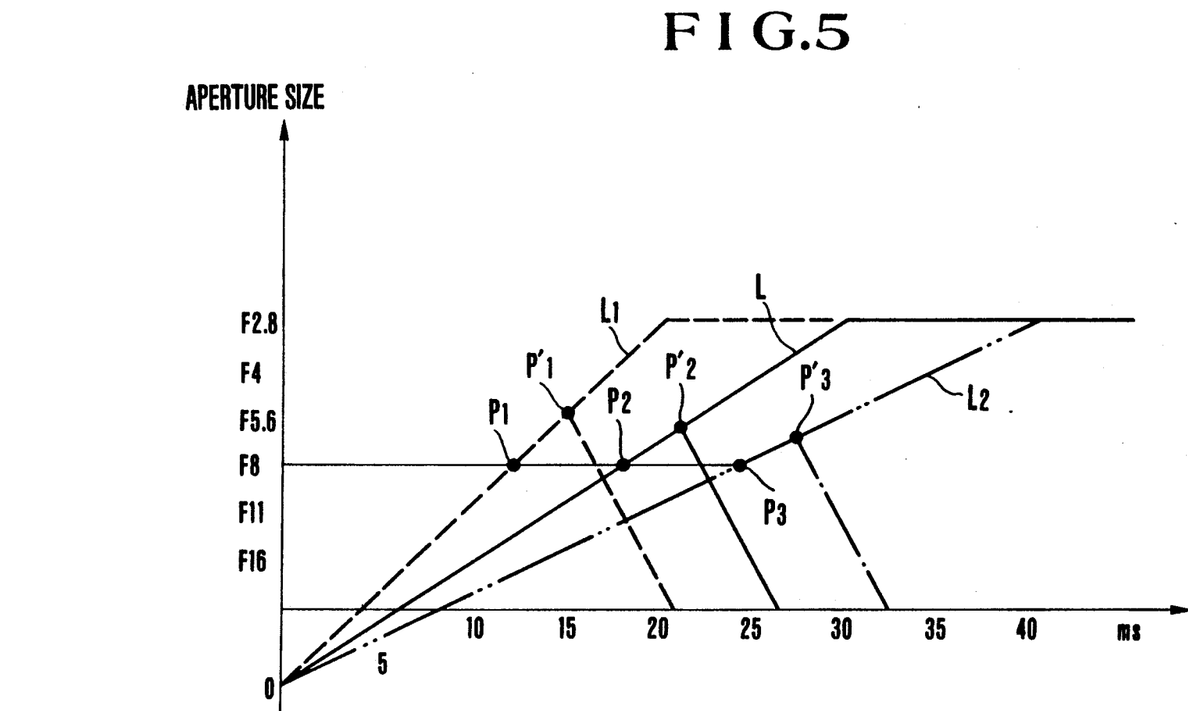
FIG. 5 is a graph illustrating variation of the exposure quantity with variation of the running characteristic of the diaphragm blades in the diaphragm-cum-shutter having the diaphragm blades driven by a motor.

FIG. 5 is a graph illustrating different manners in which the diaphragm-cum-shutter of the type described above in which the opening movement of the diaphragm blades are driven by the motor, where the exposure quantity varies with variation of the running characteristics of the diaphragm blades due to the causes such as that of varying the drive voltage of the motor. In FIG. 5, what is represented by solid lines L is the ideal running characteristic. In the case of too fast an opening speed of the diaphragm blades, the running characteristic is shown by dashed lines $L_1$. In the case of too slow an opening speed of the diaphragm blades, the running characteristic is shown by double dot and single dash lines $L_2$. Also, in FIG. 5, $P_1$ to $P_3$ represent points of time at which a signal for closing the diaphragm blades is given to the electromagnet in the aforesaid cases respectively. $P_1'$ to $P_3'$ represent points of time at which the electromagnet actually starts to operate and also represent a size of aperture opening at each of these times.

As is apparent from FIG. 5, it is understood that when the opening speed of the diaphragm blades varies, the exposure quantity integrated during one cycle of opening and closing operation of the diaphragm blades is caused also to vary. Hence, the conventional diaphragm-cum-shutter with encoder which is characterized in that it is only the amount of opening movement of the diaphragm blades that the encoder is used to detect, has been unable to make a sufficiently highly accurate exposure control.

SUMMARY OF THE INVENTION

One aspect of this invention is concerned with the exposure device using a shutter of the type which is gradually opening and, when a predetermined value has been reached, then closes the opening, and is to provide an exposure device suited to a preliminary opening and closing operation that makes it possible to control the exposure with a high accuracy.

Another aspect of this invention is to provide an exposure device capable of instantaneously carrying out sequential exposure operations.

DETAILED DESCRIPTION OF THE PREFERRED EMBODIMENTS

The invention is next described in connection with embodiments thereof by reference to the drawings.

Figure 1:
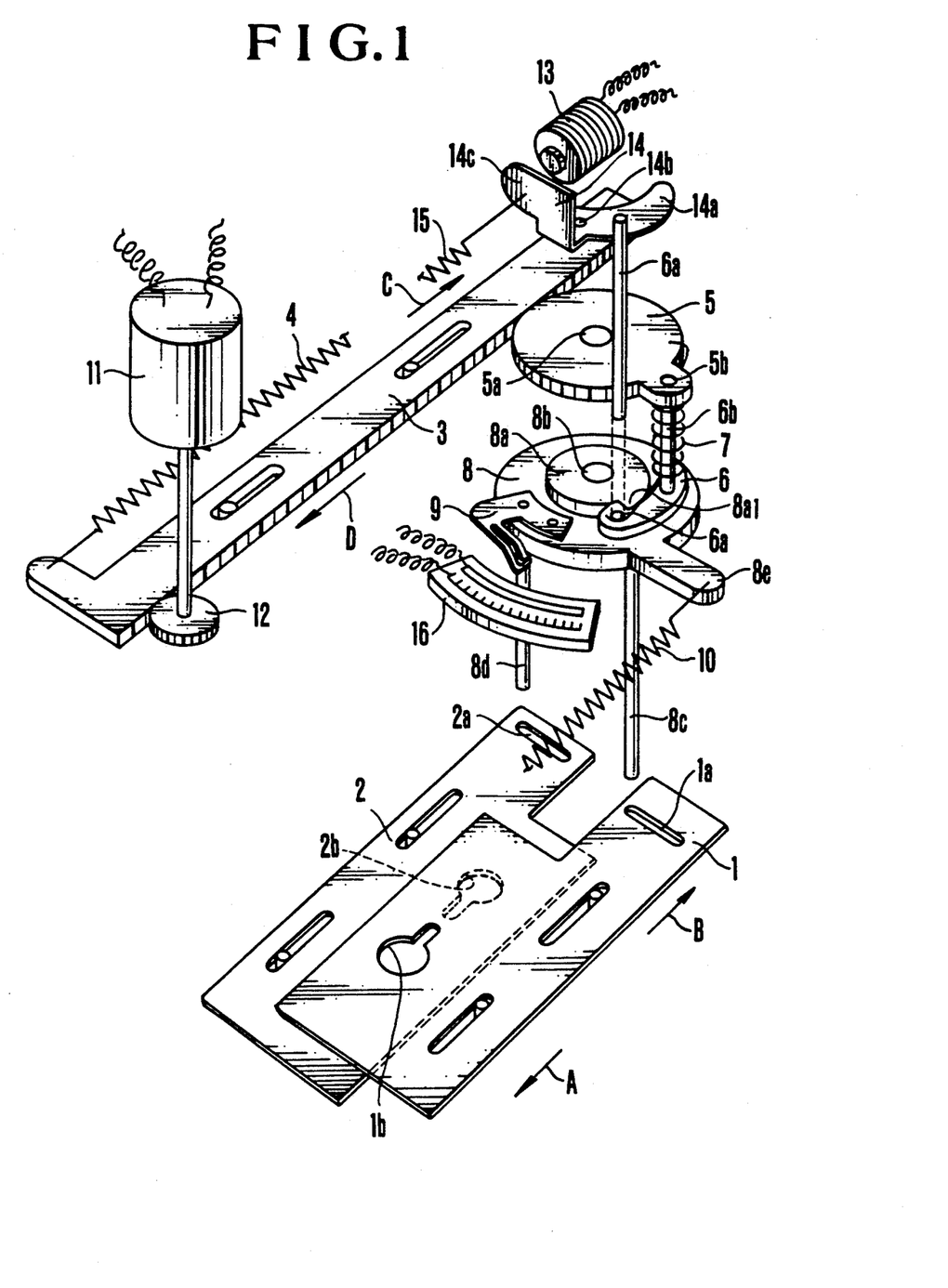
FIG. 1 is a perspective view of the mechanical arrangement of a first embodiment of an exposure device according to the invention.

FIG. 1 in exploded perspective view shows the construction and arrangement of the mechanical parts of a first embodiment of the exposure device according to the invention.

In FIG. 1, a pair of opening and closing members 1 and 2 movable relative to each other in respective directions indicated by arrows A and B respectively, or vice versa, are formed to shutter blades also serving as diaphragm blades. A blade drive plate 8 is arranged above the shutter blades 1 and 2 and has drive pins 8c and 8d extended therefrom into respective laterally elongated slots 1a and 2a bored in the shutter blades 1 and 2. Again, the shutter blades 1 and 2 have aperture openings 1b and 2b formed therein, respectively.

The blade drive plate 8 is rotatable about a shaft 8b. An engagement piece 8a having a projection $8a_1$ for engagement in the outer periphery thereof is fixedly mounted on a disc-shaped main body portion of the blade drive plate 8. A spring engaging extension 8e is formed on the outer periphery of the main body portion of the blade drive plate 8. A spring 10 whose one end is connected to that spring engaging extension 8e urges the blade drive plate 8 always in a clockwise direction about the shaft 8b.

The main body portion of the blade drive plate 8 has the aforesaid drive pins 8c and 8d which are mounted on the lower side thereof and has a slider 9 which is fixedly secured to the upper side thereof constituting part of means for detecting the amount of movement of the shutter blades 1 and 2. An encoder 16 is arranged below the blade drive plate 8 to be in sliding contact with the slider 9. Electrically conductive patterns formed on the encoder 16 are electrically connected to a detecting circuit (not shown) including a pulse counter and other circuitry.

A swinging member 6 is disposed on the upper side of the blade drive plate 8 so that its pawled portion is engageable with the engagement piece 8a. A post 6a and a shaft 6b are fixedly mounted on the swinging member 6. The post 6a engages with an armature 14 to be described later. The shaft 6b is inserted into an overbored hole 5b in a radial, outward extension of a gear 5 positioned above the blade drive plate 8. A coil spring 7 is mounted around the shaft 6b, urging the swinging member 6 to turn about the shaft 6b in a clockwise direction.

The gear 5 is rotatable about a shaft 5a and is in mesh with a rack 3. The rack 3 is in mesh with a pinion 12, and is urged always in a direction of arrow C by a spring 4. The pinion 12 is mounted on the output shaft of an electric motor 11. When the motor 11 is energized, the pinion 12 is rotated in a counterclockwise direction as viewed in the figure.

The armature 14 rotatable about a pin 14b is disposed above the rack 3. One armed portion 14c of the armature 14 is positioned adjacent the core of an electromagnet 13. Another armed portion 14a is arranged in a position where it engages with the post 6a of the swinging member 6 and, when turning, can push the post 6a, thus being able to turn the swinging member 6 in the counterclockwise direction. The armature 14 is urged by a spring 15 to turn about the pin 14b in a counterclockwise direction.

The electromagnet 13 and the motor 11 are supplied with current in predetermined timing according to the command from a control device.

In the above-described mechanism, the blade drive plate 8 and the various parts for driving the plate 8 (the gear 5, rack 3, pinion 12, armature 14, electromagnet 13, springs 10, 4 and 15, etc.) constitute opening and closing means for causing the shutter blades 1 and 2 (or the opening and closing members) to perform the opening and closing operation. Also, the encoder 16 and the slider 9 and further the detecting circuit (not shown) constitute movement amount detecting means for detecting the amount of movement and the position of the opening and closing members (in other words, means for detecting the size of opening of an exposure aperture).

Incidentally, though not shown in FIG. 1, an image sensor is positioned in axial alignment with the exposure aperture formed by the shutter blades 1 and 2. This image sensor, a signal processing circuit for processing the output signal of the element and an integration circuit for the output of the image sensor constitute incident light amount detecting means for detecting the amount of incident light.

In the interior of the control device to which the aforesaid movement amount detecting means and the incident light amount detecting means are electrically connected, there are formed operation control means for causing the opening and closing members (shutter blades) to perform its opening and closing operation twice in sequence, and means responsive to the outputs of the movement amount detecting means and the incident light amount detecting means for determining and selecting the reference value for the operation of the opening and closing members.

Figure 2:
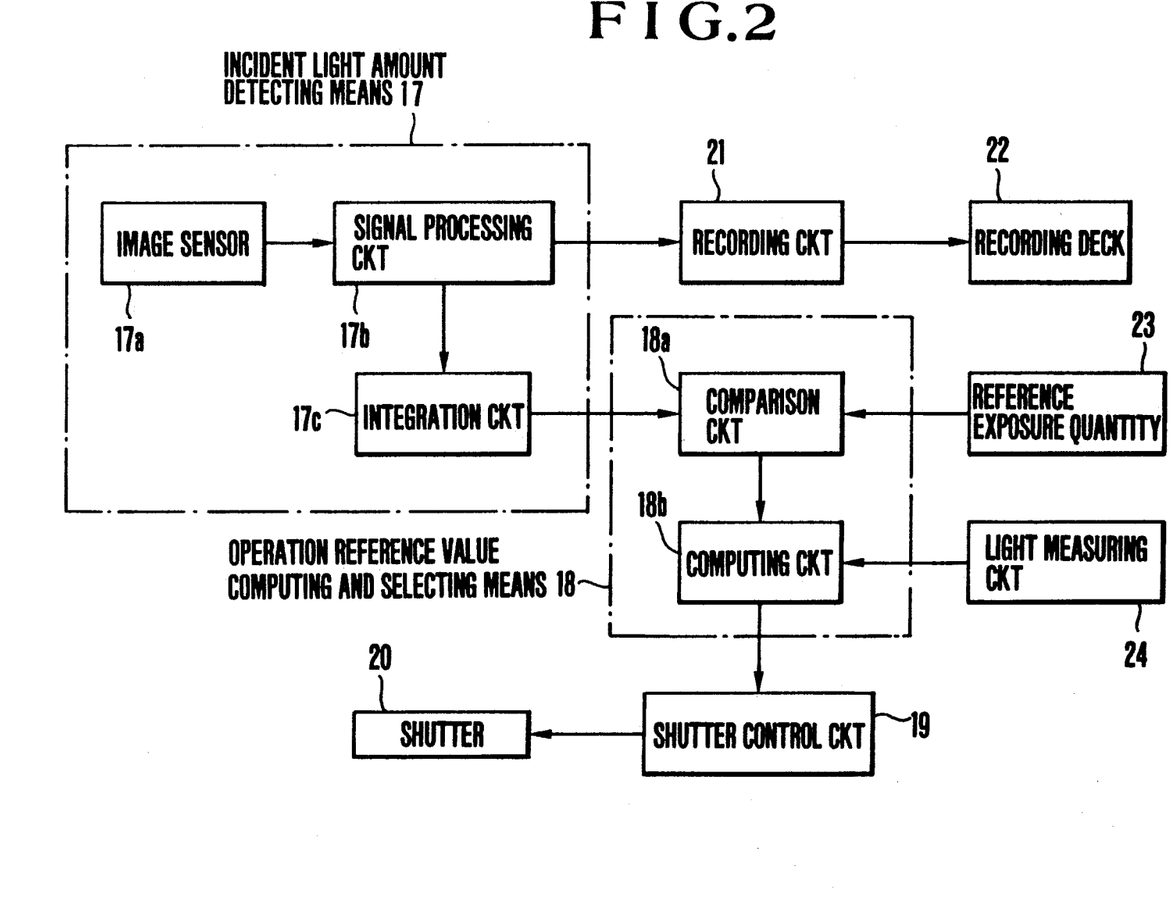
FIG. 2 is a block diagram of a part of the electrical arrangement of the exposure device of FIG. 1.

FIG. 2 roughly, or in block form, shows some electrical constituents of the exposure device of the invention, including the incident light amount detecting means, and the operation reference value forming means for forming a reference value for the operation of the opening and closing members when in that opening and closing operation which actually effects an exposure.

In FIG. 2, the incident light amount detecting means 17 comprises an image sensor 17a, a signal processing circuit 17b and an integration circuit 17c. The operation reference value computing and selecting means 18 for computing and selecting an operation reference value in the actual exposure opening and closing operation of the opening and closing members (the shutter blades 1 and 2) comprises a comparison circuit 18a and a computing circuit 18b. Again, in FIG. 2, a shutter control circuit 19 controls the current supply to the motor 11 and the electromagnet 13 in such a manner that the opening and closing members are caused to perform a first cycle of opening and closing operation which effects no exposure, and a second cycle of opening and closing operation which effects an exposure. A block 20 labeled shutter signifies particular ones of the elements of the opening and closing means shown in FIG. 1, namely, the motor 11 and the electromagnet 13. A reference numeral 21 represents a recording circuit, 22 a recording deck, 23 a reference exposure quantity, and 24 a light measuring circuit.

Figure 3:
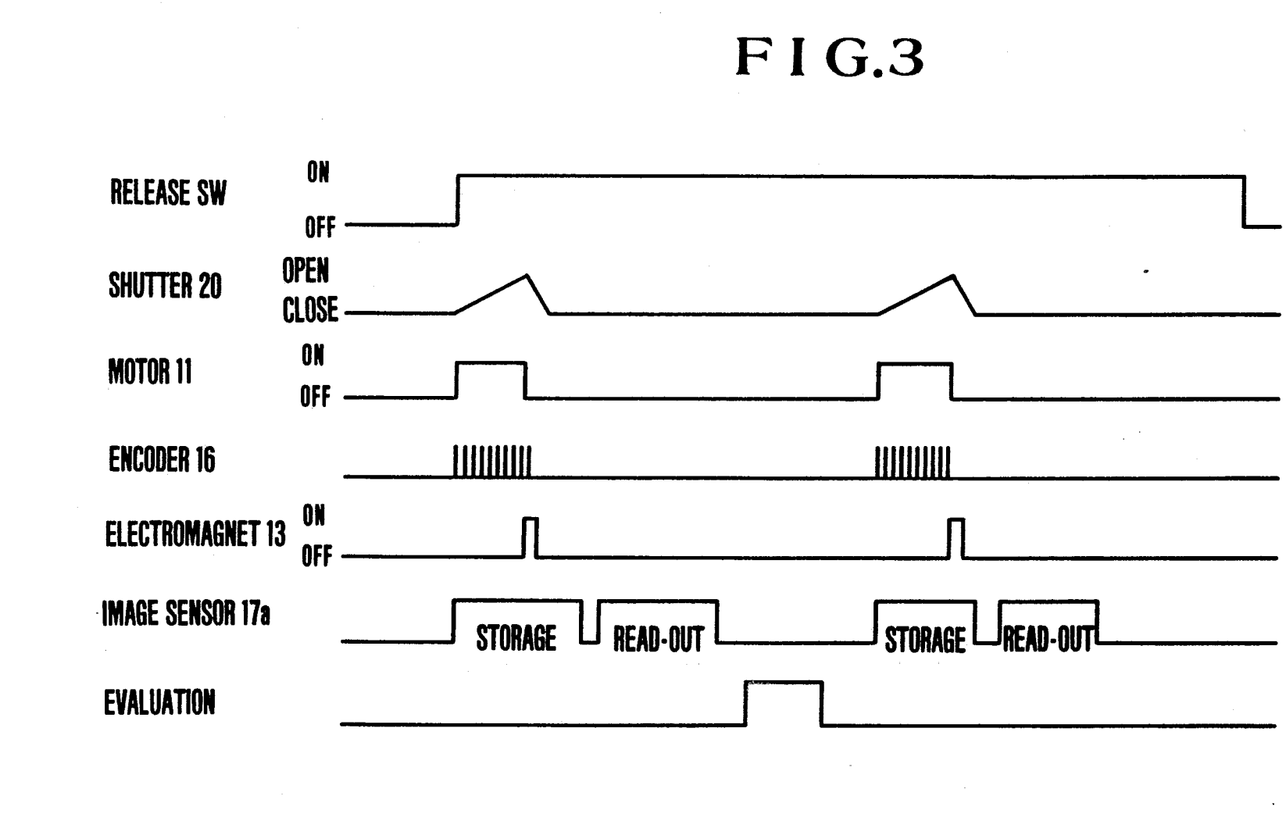
FIG. 3 is a timing chart illustrating a manner in which the exposure device of FIGS. 1 and 2 and those parts in the camera which are associated with the exposure device operate.
Figure 4:
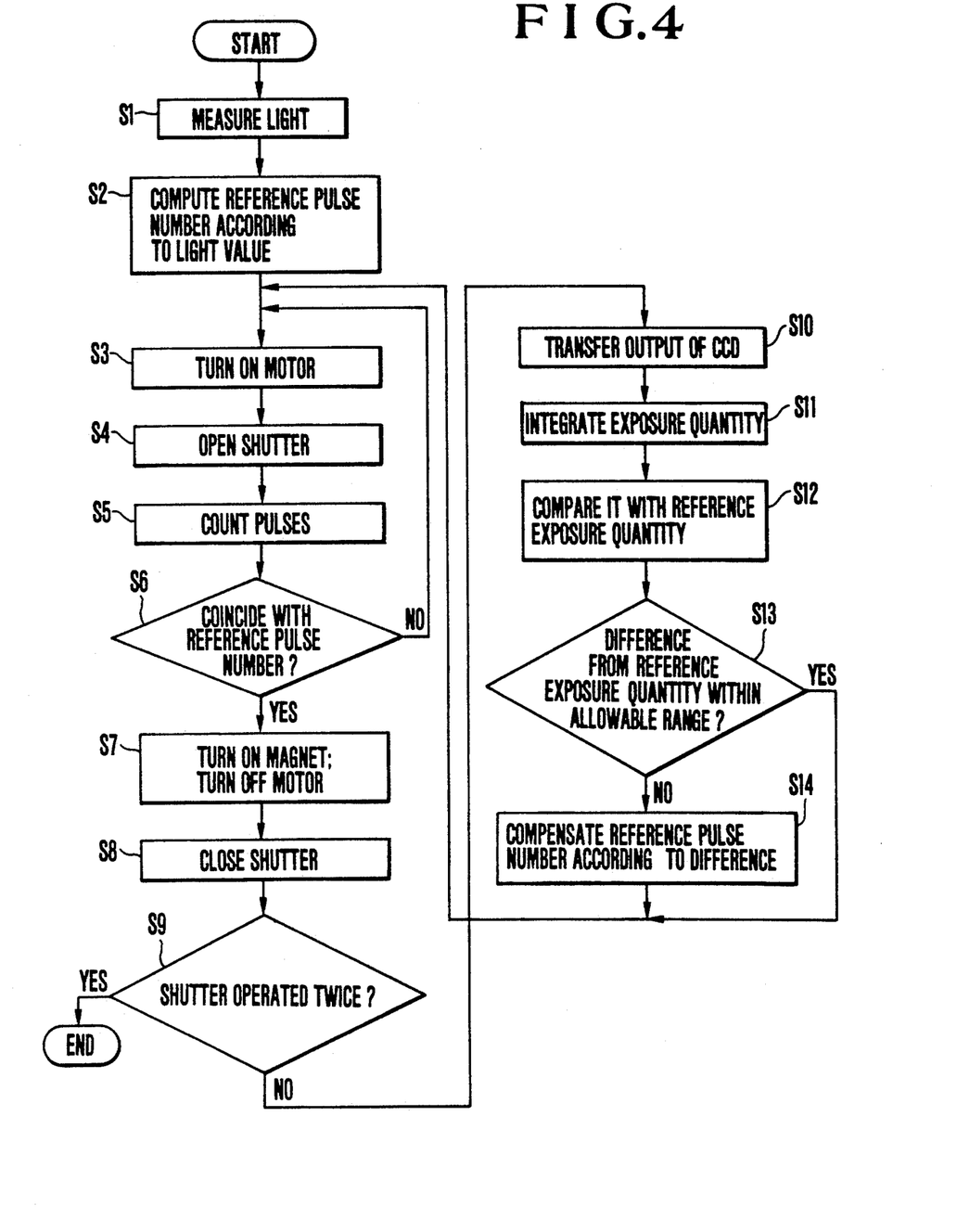
FIG. 4 is a flowchart for the control operation of the exposure device and the associated parts therewith in the camera.

FIG. 3 is a timing chart illustrating a manner in which the exposure device of this embodiment having the features shown in FIG. 1 and FIG. 2 and the associated parts therewith in the camera operate. FIG. 4 is a flowchart illustrating the control operation of the exposure device and associated parts therewith in the aforesaid camera.

Referring to FIG. 1 through FIG. 4, the operation of the camera and the exposure device is described below.

When the camera user with intention of taking a shot manipulates the release button of the camera by half pushing, a release switch (not shown) is turned on to actuate a light measuring device (not shown), thereby carrying out a light measurement (step S1). Upon completion of the light measurement, the light measuring circuit 24 produces an output representing the measured light value which is supplied to the operation reference value computing and selecting means 18 (FIG. 2). The computing circuit 18b in that means 18 computes a reference value (reference pulse number) for the amount of movement of the shutter blades in correspondence to the measured light value (step S2). Meanwhile, at the same time when the release switch turns on, a current is supplied to the motor 11, and the motor 11 rotates the pinion 12 in the counterclockwise direction in FIG. 1 (step S3). Therefore, the rack 3 is moved in the direction of arrow D in FIG. 1, which in turn causes the gear 5 to rotate about the shaft 5a in the counterclockwise direction. Counterclockwise rotation of the gear 5 causes counterclockwise revolution of the shaft 6b about the shaft 5a. Therefore, the swinging member 6 is revolved in the counterclockwise direction through the shaft 6b, so that the engagement piece 8a in engaging relation with the swinging member 6 is rotated about the shaft 8b in the counterclockwise direction. As a result, the main body of the blade drive plate 8 of unified form with the engagement piece 8a is rotated about the shaft 8b in the counterclockwise direction. Therefore, the drive pins 8c and 8d also are caused to revolve around the shaft 8b in the counterclockwise direction, so that the shutter blade 1 is moved in the direction of arrow B, while the shutter blade 2 is moved in the direction of arrow A. Thus, the shutter is opening (step S4). The size of this opening of the shutter (in other words, the amount of movement of the opening and closing members) is detected as a pulse number by a detecting circuit (not shown) as the slider 9 carried by the blade drive plate 8 moves while coming into contact with the conductive pattern on the upper surface of the encoder 16. The pulses are being counted by a counter in that detecting circuit (step S5). In the shutter control circuit 19 (FIG. 2), the number of counted pulses is then compared with the above-described reference pulse number (the reference pulse number computed based on the measured light value) (step S6). And the shutter control circuit 19 permits the motor 11 to continue rotating counterclockwise so that the shutter blades 1 and 2 continue opening, so long as the pulse number detected by the encoder 16 does not reach the reference pulse number.

Meanwhile, as the shutter blades 1 and 2 are being moved in such a manner, light enters the image sensor 17a at the same time when the shutter 20 starts to open. The image sensor 17a starts to store the charges corresponding to all the incident light amount on itself (see FIG. 3).

Then, when the pulse number detected by the encoder 16 has coincided with the reference pulse number, the motor 11 is stopped by the shutter control circuit 19 (FIG. 2), so that the opening operation of the shutter blades 1 and 2 terminates and the encoder 16 no longer produces the output (step S7). At the same time that the signal for stopping the motor 11 is output, another signal for initiating a current supply to the electromagnet 13 is output from the shutter control circuit 19. Therefore, as the electromagnet 13 is energized, one armed portion 14c of the armature 14 is attracted to the core of the electromagnet 13 (step S7). The armature 14 is then turned about the pin 14b in the clockwise direction. Because the other armed portion 14a of the armature 14 expels the post 6a of the swinging member 6 forward in FIG. 1, the swinging member 6 is turned about the shaft 6b in the counterclockwise direction. As a result, the pawled portion in one end of the swinging member 6 is disengaged from the engagement portion 8a₁ of the engagement piece 8a. Thereupon, the blade drive plate 8 is rotated by the force of the spring 10 in the clockwise direction, so that the shutter blade 1 is moved in the direction of arrow A by the drive pin 8c, while the shutter blade 2 is moved in the direction of arrow B by the drive pin 8d. Thus, the initial position is regained with the result that the shutter 20 (the aperture opening) is closed (step S8). Meanwhile, the rack 3 is moved by the force of the spring 4 in the direction of arrow C and returns to the initial position. As a result, the gear 5 also is rotated about the shaft 5a in the clockwise direction, while the shaft 6b is revolved around the shaft 5a in the clockwise direction. Therefore, the swinging member 6 returns to the initial position. Incidentally, since the force of the spring 4 is set to be stronger than the cogging torque of the motor 11, the returning movement of the rack 3 to the initial position is accompanied with clockwise rotation of the pinion 12 and the output shaft of the motor 11 to the initial position. It should be pointed out that this or first opening and closing operation is a non-exposure (non-shot) opening and closing operation, or a preliminary opening and closing operation which is performed prior to the actual shooting operation. (By a step S9, whether the operation at present is the first cycle of opening and closing operation for non-exposure or the second cycle of opening and closing operation for taking a picture is determined.)

In such a manner, the shutter is opened and closed for the first time. After that, the charges stored in the image sensor 17a corresponding to all the amount of light incident on the image sensor 17a during the first opening and closing operation are read out in sequence as the output of the image sensor 17a through the signal processing circuit 17b (step S10), and the aforesaid output is supplied to the recording circuit 21 and the integration circuit 17c (see FIG. 2 through FIG. 4). The integrated value in the integration circuit 17c (step S11) represents the whole light amount incident on the image sensor 17a during the first opening and closing operation. The output of the integration circuit 17c is supplied to the comparison circuit 18a in which it is compared with the reference exposure quantity 23 (step S12). The comparison circuit 18a produces an output representing the difference between the reference exposure quantity 23 and the output of the integration circuit 17c, which is then supplied to the computing circuit 18b. In the computing circuit 18b, if the difference between the reference exposure quantity 23 and the output of the integration circuit 17c does not lie within an allowable range (step S13), the aforesaid reference pulse number (i.e., the reference amount of opening movement of the diaphragm blades) is compensated on the basis of the aforesaid difference and the measured light amount to obtain a new reference value for the amount of opening movement. This new reference value for the amount of opening movement is set as a new reference value in the shutter control circuit 19 (step S14). Incidentally, the operation of integrating the output of the image sensor 17a, making judgment concerning the difference between the output of the integration circuit 17c and the reference exposure quantity 23 and doing others is represented by the operation labeled "evaluation" in FIG. 3.

Since a new opening movement amount reference value newly set in the aforesaid evaluating operation has been formed on the basis of the actual incident light amount, in a case where the amount of opening movement of the shutter blades is controlled in accordance with this new opening movement amount reference value, even if the running characteristic of the shutter blades has changed by, for example, a change of the drive voltage of the motor 11, the amount of opening movement of the shutter blades can be controlled so that a predetermined exposure quantity results.

Meanwhile, in another case where the difference between the output of the integration circuit 17c and the reference exposure quantity 23 is determined in the aforesaid evaluating operation to fall within the allowable range, as it implies that no large change occurs in the running characteristic of the shutter blades, no new movement amount reference value is formed, and a shutter blade movement amount reference value to be set in the shutter control circuit 19 becomes the reference value (reference pulse number) used in the first or preliminary opening and closing operation. Therefore, as will be described below, the reference value for governing the amount of opening movement of the shutter blades in the second or actual exposure opening and closing operation becomes the same as the reference value in the first or preliminary opening and closing operation.

When such an evaluating operation as described above has ended, the motor 11 is rotated again in the counterclockwise direction by the operation control means (not shown) (step S3). In accompaniment with this, in a similar manner to that described above, the shutter blades 1 and 2 are forcibly driven by the power of the motor 11 in the shutter opening direction (step S4). At the same time, the amount of movement of the shutter blades 1 and 2 is detected as a pulse signal by the encoder 16 (step S5) and is compared with the movement amount reference value in the shutter control circuit 19 (step S6). With this, if the shutter blade movement amount reference value (reference pulse number) set in the shutter control circuit is the new movement amount reference value compensated by the aforesaid evaluating operation, the amount of opening movement of the shutter blades 1 and 2 becomes different from the amount of opening movement in the first or preliminary opening and closing operation. Hence the opening operation is carried out in accordance with the actual incident light amount.

Meanwhile, in a case where no new movement amount reference value has been set by the aforesaid evaluating operation, the shutter blade opening movement in the second or actual exposure operation also is controlled by the movement amount reference value in the first or preliminary or non-exposure operation.

When the detected value by the encoder 16 and the movement amount reference value have coincided with each other, a current is supplied from the shutter control circuit 19 to the electromagnet 13, and the current supply to the motor 11 is stopped (step S7). Likewise as in the first cycle, the shutter blades 1 and 2 are then moved in the closing direction by the force of the spring 10 (step S8). After the shutter has been closed, the release switch turns off.

The opening movement amount reference value which is set for the second opening and closing operation is determined based on the shutter blade movement amount or the incident light amount in the first or preliminary opening and closing operation. Therefore, in the second opening and closing operation, the timing of production of the actuating signal for the electromagnet 13 is compensated to what foresees the delay of operation of the electromagnet 13. In the exposure device of this embodiment, therefore, even if there has been a change in the running characteristic of the shutter blades, the exposure control can be made always with high accuracy.

It is to be understood from the foregoing that in the exposure device of the first embodiment, even if a change has occurred in the running characteristic of the shutter blades, the use of two consecutive shutter operations enables the exposure control to be made always with high accuracy. Also, because the second opening and closing operation of the shutter blades can be performed instantaneously in sequence to the first opening and closing operation without a particular charge driving, the release time lag does not become so much long.

Figure 6:
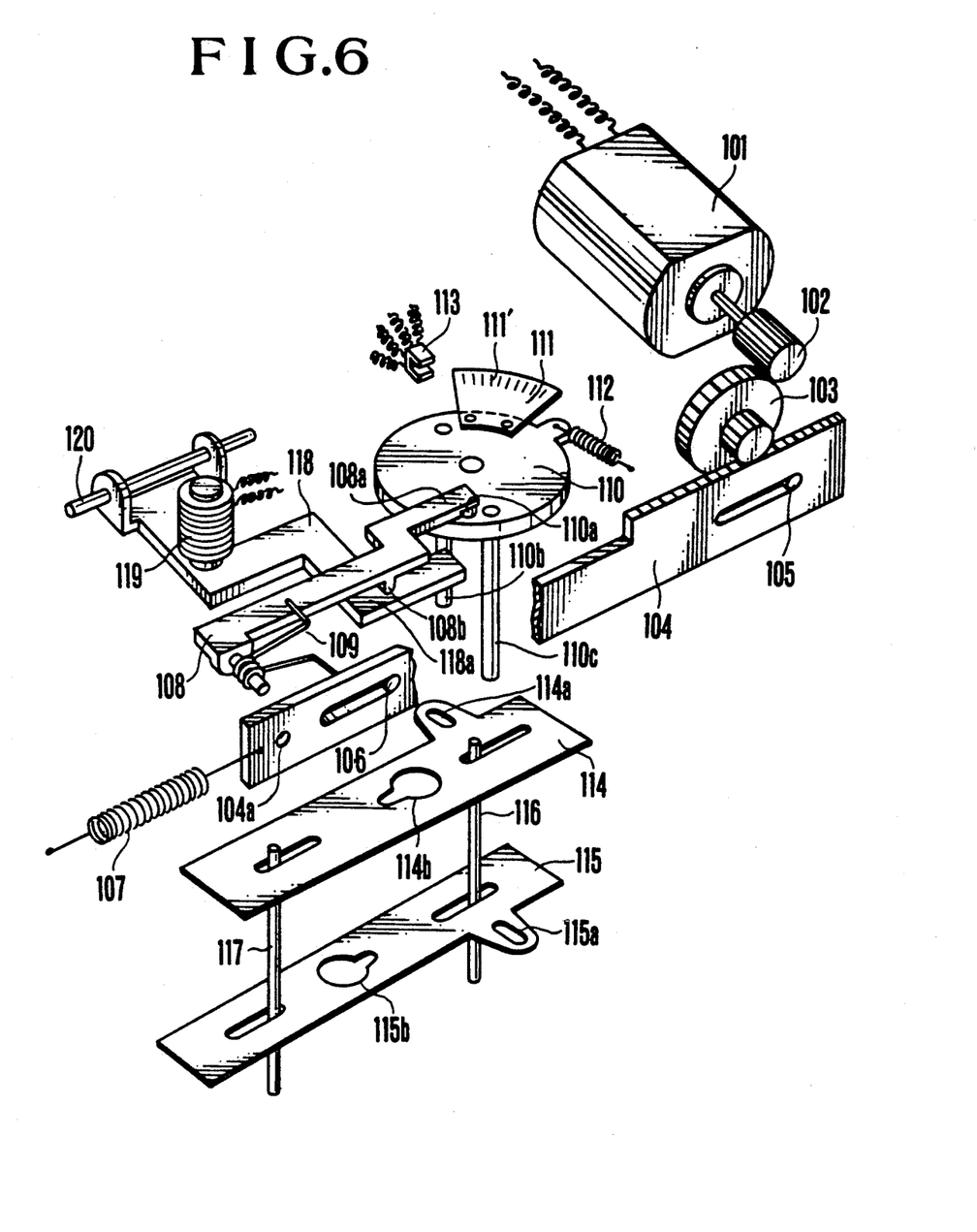
FIG. 6 is a perspective view of the mechanical arrangement of a second embodiment of the exposure device according to the invention.
Figure 7:
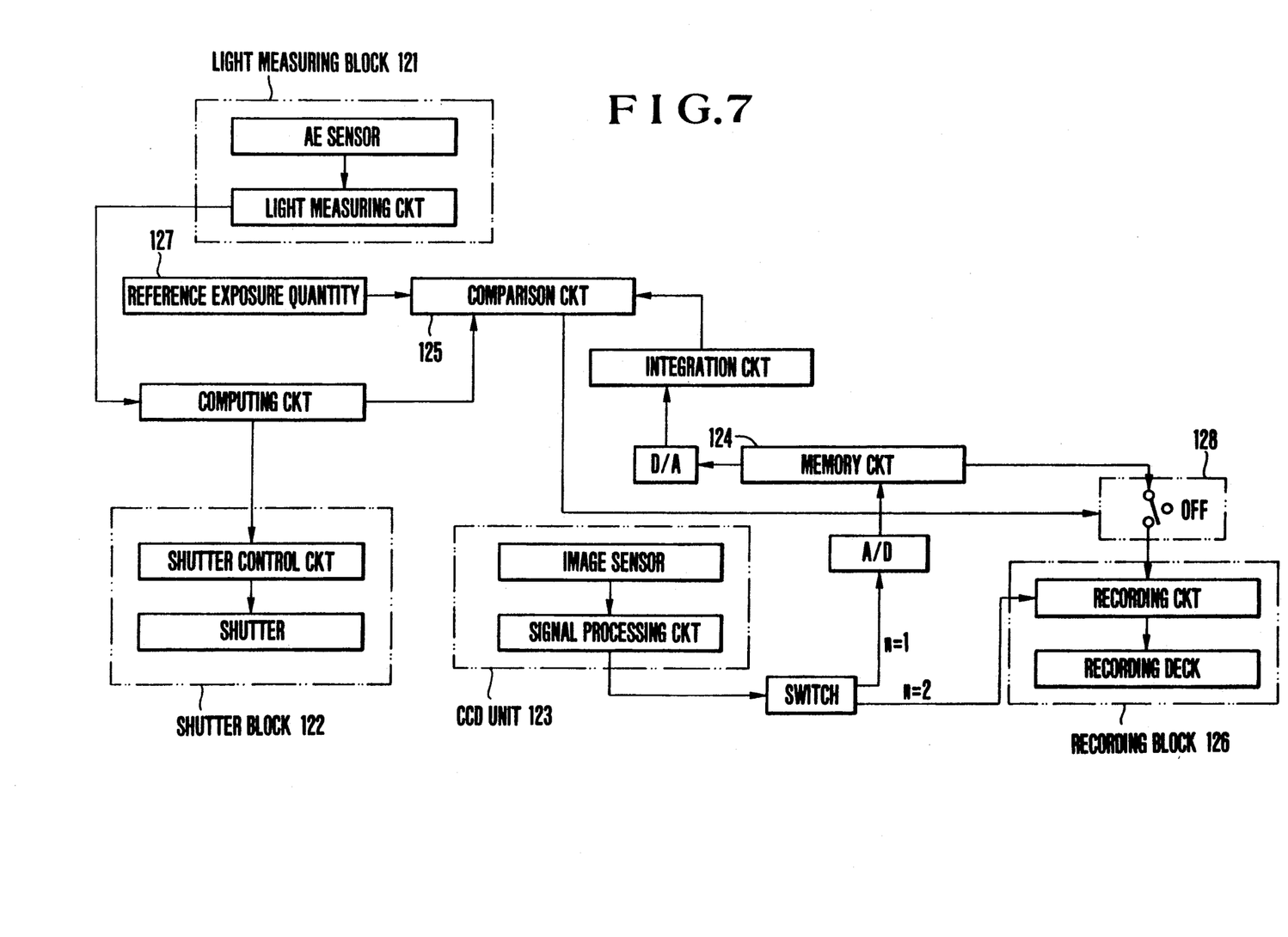
FIG. 7 is a block diagram of the circuitry of the second embodiment.
Figure 8:
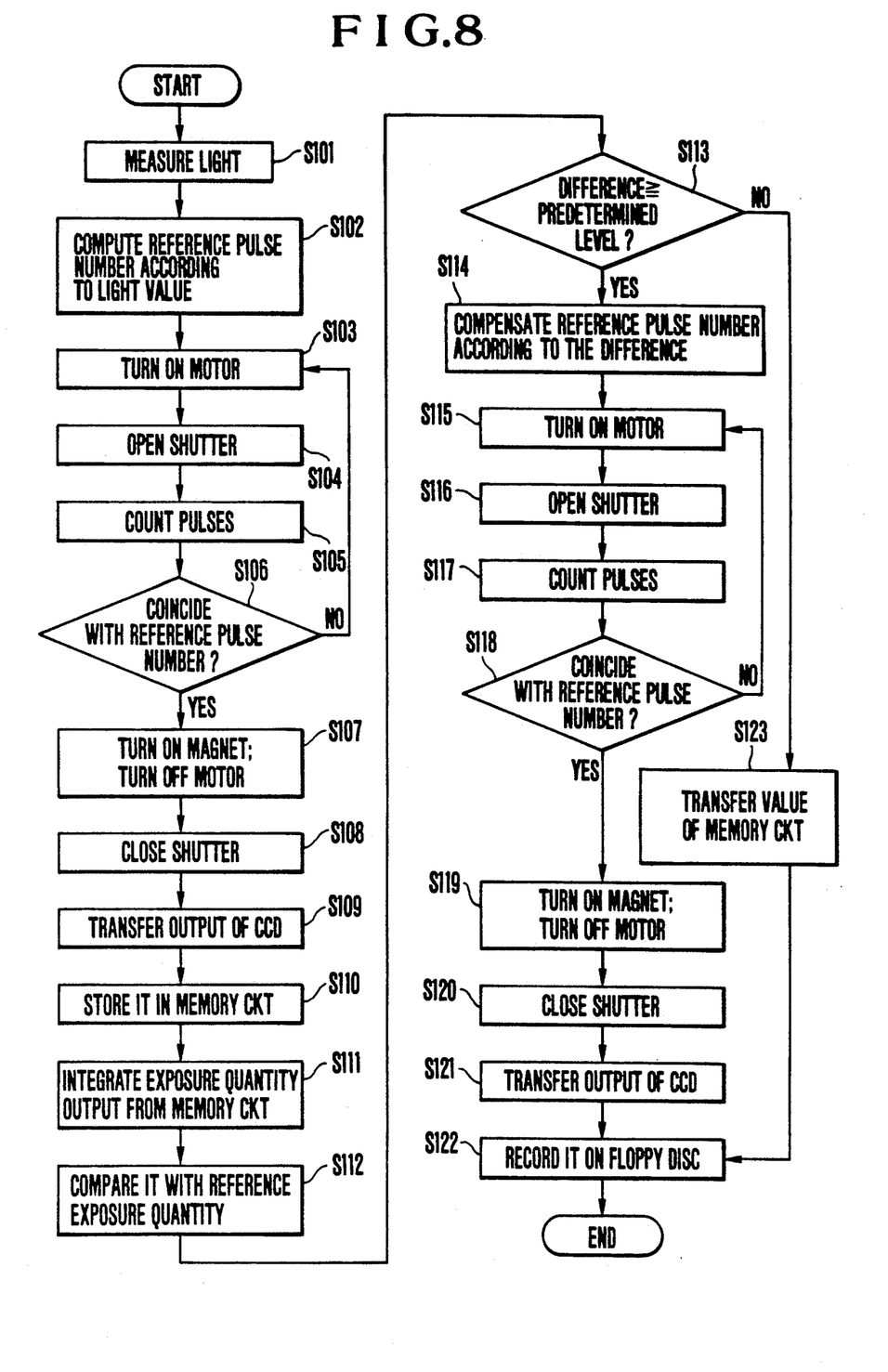
FIG. 8 is a flowchart for the operation of the circuit of FIG. 7.

FIG. 6 through FIG. 8 show a second embodiment of the invention. In the case of AE photography, after the actuation of a camera release, the shutter opens bit by bit. Along with this, the number of pulses representing the aperture value to be counted in linkage with the shutter is increasing. When it has reached a predetermined pulse number Pn, an electromagnet is energized. In a delay time Tm due to the inertia of the electromagnet, the shutter is released from the clutching connection, and rapidly closes. Image information obtained at this time is stored for a certain time. The exposure quantity of the image information is then compared with the reference exposure quantity. If their difference is larger than a certain value, that difference is considered in compensating the exposure movement amount when the second exposure operation is carried out.

This exposure operation is performed by using a circuit shown in FIG. 7.

In FIG. 7, reference numeral 121 denotes a light measuring block. By the measured light value obtained by this light measuring block 121, the shutter of a shutter block 122 is operated. Responsive to this exposure, a CCD unit 123 produces the image information which is then stored in a memory circuit 124. The exposure quantity of that image information is compared with a reference exposure quantity 127 by a comparison circuit 125. In a case where the difference is not larger than a certain value, that image information is supplied through a switch 128 to a recording block 126 where it is recorded. In another case where the difference is larger than the certain value, the exposure operation is carried out again. The thus-obtained image information is recorded in the recording block 126.

In FIG. 6, a mechanical construction of the exposure device includes a motor 101, a pinion gear 102, a speed reduction gear 103, a rack gear 104 guided by rack guide shafts 105 and 106, and a return spring 107 for the rack gear 104. A clutch 108 is rotatably mounted about a pivot hole 104a in the rack gear 104 and is urged by a spring 109 (in a clockwise direction) so that its free end 108a engages a post 110a mounted on a control disc 110. A pulse sector 111 is fixedly secured on the control disc 110, and has its transparent portion 111' arranged to move across a photo-interpreter 113. Reference numeral 112 denotes a return spring for the control disc 110. Shutter blades 114 and 115 are guided by common guide pins 116 and 117. Drive pins 110b and 110c extend from the lower side of the control disc 110, respectively, into a slot 114a of the shutter blade 114 and a slot 115a of the shutter blade 115. Aperture portions 114b and 115b form a variable size of aperture opening. An armature 118 of magnet, when a coil 119 is energized, turns about a pivot shaft 120 in a counterclockwise direction so that its free end 118a strikes a protuberance 108b of the clutch 108, releasing the post 110a of the control disc 110 from the engagement with the free end 108a of the clutch 108.

Next, a sequence of operations is described. At first, the normal AE mode is described. After the camera is released, as the motor 101 rotates in the clockwise direction, and the speed reduction gear 103 rotates in the counterclockwise direction, the rack gear 104 starts to slide to the right against the spring 107. And, the clutch 108 attached to the rack gear 104 also slides to the right. Therefore, the post 110a of the control disc 110 is pushed by the free end 108a of the clutch 108, so that the control disc 110 is rotated counterclockwise against the spring 112. By the pin 110b, the shutter blade 114 is caused to slide to the left, while by the pin 110c, the shutter blade 115 is caused to slide to the right. Thus, the aperture progresses in size. At the same time, the pulse sector 111 on the control disc 110 revolves in the counterclockwise direction to permit the photo-interpreter 113 to count gradients on the transparent portion 111' of the pulse sector 111. When the number of counted pulses has reached a predetermined value, the coil 119 is energized to attract the armature 118 upward so that the free end 118a strikes the protuberance 108b of the clutch 108. Because this results in the release of the post 110a from the engagement with the free end 108a, the control disc 110 is rotated in the clockwise direction by the return spring 112. By the pins 110b and 110c, the shutter blades 114 and 115 are returned, thus closing the shutter. After that, the motor 101 rotates in the reverse direction and, under the combined action with the contracting force of the spring 107, causes the rack gear 104 to slide to the left until it reaches the initial position. Thus, the sequence of operations is completed.

In FIG. 8, the light measuring block 121 carries out light measurement (step S101). The measured light value is then converted into a corresponding reference pulse number (step S102). The motor 101 is energized (step S103) to open the shutter (step S104) until the number of pulses counted during the opening of the shutter (step S105) coincides with that reference pulse number (step S106). Upon coincidence, the motor 101 is turned off and the magnet is energized (step S107) to stop the exposure operation by closing the shutter (step S108). This exposure permits the CCD unit 123 to produce image information (step S109), which is then transferred to, and once stored in, the memory circuit 124 (step S110). The image information is non-destructively read out, and integrated to obtain an exposure quantity (step S111). It is then compared with the reference exposure quantity (step S112). If the difference is smaller than a predetermined level (step S113), then the image information stored in the memory circuit 124 is read out (S123) and recorded on a floppy disc (step S122). If the difference is not smaller than the predetermined level (step S113), then the reference pulse number is compensated in accordance with the difference (step S114) and the exposure operation is carried out once more (steps S115–S121). The obtained image information is recorded on the floppy disc (step S122).

As has been described above, according to the second embodiment, the image information obtained in the first or non-exposure opening and closing operation is once stored in the memory circuit, then an exposure quantity is derived from the integration of that image information and then compared with the reference exposure quantity. In a case where it differs by more than a predetermined value, the second or exposure opening and closing operation is carried out by taking into account the difference from the exposure quantity obtained by the non-exposure opening and closing operation. If the difference is smaller than the predetermined value, then the value of the memory circuit is recorded without any alteration onto a recording medium such as floppy disc, thereby obviating the unnecessary fresh start of an exposure operation. This enables a high accuracy exposure control to be made without causing the manageability to deteriorate in any way.

Also, in the exposure device of the second embodiment, suppose the exposure quantity obtained by the first shutter opening and closing operation has deviated from the reference exposure quantity by more than the predetermined value, then subsequently the second shutter opening and closing operation takes place. However, this second shutter opening and closing operation is carried out without having to effect a particular charge driving. So, it can be carried out instantaneously. Therefore, even though the two successive cycles of shutter opening and closing operation have to be carried out for a single exposure, the release time lag does not become unduly long. Also, as compared with the first embodiment, the returning of the shutter to the initial state can be carried out earlier by a time necessary for the motor to rotate in the reverse direction.

Figure 9:
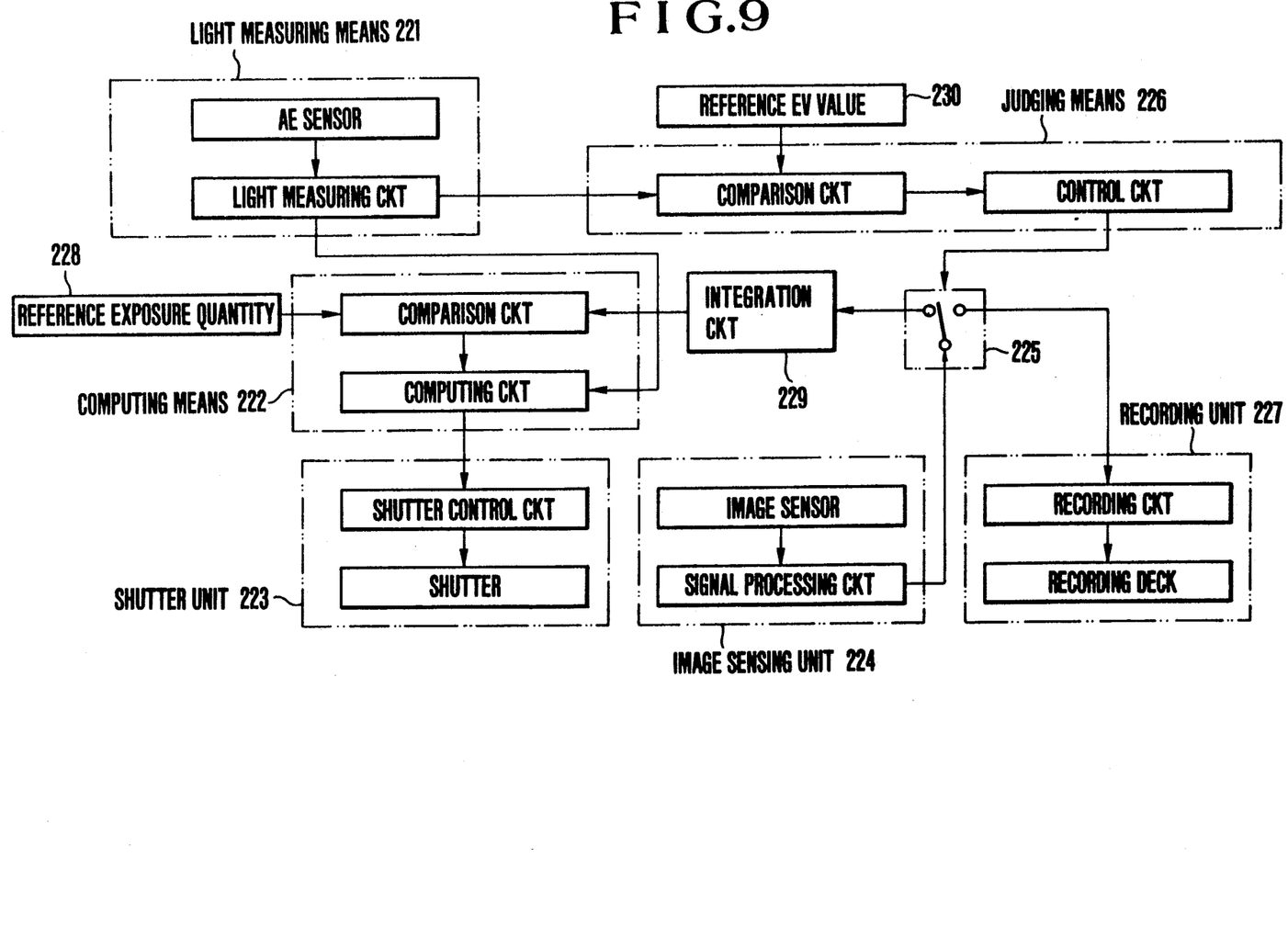
FIG. 9 is a block diagram of the circuitry of a third embodiment of the invention.
Figure 10:
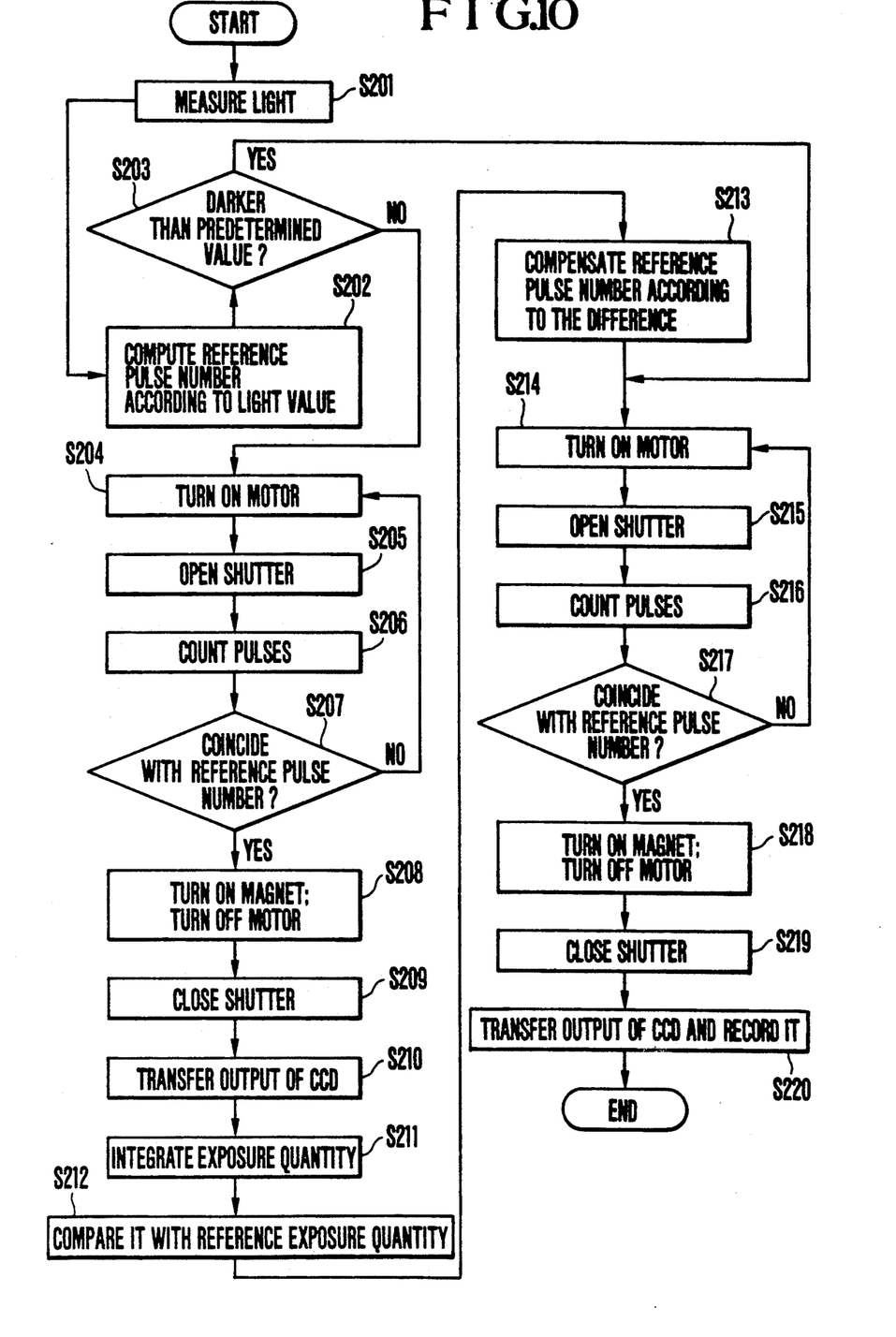
FIG. 10 is a flowchart for the operation of the circuit of FIG. 9.

Next, a third embodiment of the invention is described on the basis of FIG. 9 and FIG. 10. The mechanism of the exposure device in the third embodiment, because of its being the same as that shown in FIG. 6, is omitted.

In FIG. 9, the circuit of the exposure device comprises a light measuring means 221, a computing means 222, a shutter unit 223, an image sensing unit 24, switching means 225, a judging means 226, and a recording unit 227.

The light measuring means 221 has an AE sensor and a light measuring circuit, which produces an output representing a light value. Responsive to this, a computing circuit in the computing means 222 sends information to the shutter unit 223, so that the shutter opens and closes. This permits optical image information to enter the image sensing unit 224. The judging means 226 receptive of the information from the light measuring means 221 and a reference EV value 230 judges whether or not the second exposure operation is necessary. Depending on the output of the judging means 226, the output of the image sensing unit 224 is supplied to either one of a comparison circuit of the computing means 222 and the recording unit 227 by the switching means 225. In a case where the output of the image sensing unit 224 is supplied through an integration circuit 229 to the comparison circuit of the computing means 222, it is compared with the reference exposure quantity 228 by the comparison circuit of the computing means 222, so that their difference is reduced to zero by a compensation. Information about this is sent to the shutter unit 223, so that the second exposure operation is carried out.

In FIG. 10, depending on whether the value obtained by the light measurement is darker or brighter than a predetermined value, the following different procedures result.

That is, the light value obtained by the light measurement (step S201) is converted into a reference pulse number (step S202). If, as that measured light value is darker than a predetermined value determined by the reference pulse number, the required exposure time is judged to be long (step S203), the second exposure operation is then not carried out. If that measured light value is brighter than the predetermined value, the second exposure operation is then carried out.

In more detail, first concerning a case where the value obtained by the light measurement is brighter than the predetermined value, the motor is energized (step S204) to open the shutter (step S205). During the opening operation of the shutter, pulses are counted (step S206). The number of produced pulses is compared with the reference pulse number corresponding to the measured light value (step S207). When both pulse numbers have come to coincidence, the motor 101 is stopped and the magnet is turned on to terminate the exposure operation (step S208). And, that exposure permits the CCD to derive a value (step S210) which is then integrated (step S211) to obtain an exposure quantity. It is then compared with the reference exposure quantity (step S212). By this comparison, a reference pulse number compensated in accordance with the difference is sought (step S213). For a second time, by this compensated reference pulse number, the exposure operation is carried out (steps S214–S219). After that, a signal is read out from the image sensing unit 224 and is supplied through the switching means 225 to the recording unit 227, where it is recorded (step S220).

In a case where the value obtained by the light measurement is darker than the predetermined value, the process advances from the step S203 to the step S214. Therefore, the shutter opening and closing operation is carried out only once.

As has been described above, according to the third embodiment, in a case where the time for which the opening and closing operation of the opening and closing members is carried out has been judged to be longer than a certain constant value on the basis of the value output from the element for measuring the light quantity of a photographic target, the preliminary opening and closing operation is not carried out. Yet, it becomes possible that the exposure opening and closing operation is carried out based on the value output from the element for measuring the light quantity of the photographic target. In other words, the value output from the element for measuring the light quantity of the photographic target, which value becomes the reference value for the first or non-exposure opening and closing operation, is used in judging whether or not that non-exposure opening and closing operation is to be carried out. With this, even if it has happened that there is a change in the running characteristic or other factors of the opening and closing members such as the shutter blades, a lowering of the accuracy of exposure control which would otherwise result from that change can be prevented from occurring. Moreover, the exposure control can be made with high accuracy in such a way that good manageability of the camera is preserved. In a case where the two cycles of opening and closing operation of the opening and closing members have been judged to be unnecessary, the first one, or the preliminary opening and closing operation, is skipped so that only one cycle suffices. Therefore, the release time lag can be prevented from becoming longer than necessary.

Though the first to third embodiments have been described in connection with the shutter of the diaphragm-cum type, the invention is not confined thereto. It is applicable even to another type of shutter which is formed independently of the diaphragm.

The shutter for the invention may be of any other types, provided it gradually opens from the closed state, and, when the opening of aperture has reached a predetermined size, returns to the initial or closed state.

What is characteristic of the exposure devices of the above-described first to third embodiments is that even though, when taking a picture, the opening and closing operation of the shutter blades is repeated serially a plurality of times (virtually twice), the release time lag does not become unduly long. This characteristic feature is derived from techniques, one of which is that the opening operation of the shutter blades is performed by the driving power of the motor, while charging a spring member, whereas the closing operation of the shutter blades is performed by the force of the charged spring member. That is, at the termination of the first opening and closing operation of the shutter blades, the opening and closing mechanism has already returned to, and set in, the initial state of before the opening and closing operation. Hence, the next opening and closing operation of the shutter blades can immediately be started.

Unlike this, if the exposure device is equipped with the shutter of, for example, such a type that prior to opening the shutter blades, a previous charging of the drive spring member is necessary, the first opening and closing operation of the shutter blades must be followed by the charging operation. Therefore, when two cycles of opening and closing operation of the shutter blades are serially carried out, the time the charging operation takes contributes to an increase of the release time lag. Hence, the use of two cycles of opening and closing operation of the shutter blades for one shot is not practical because the release time lag becomes too much long.

Another feature which is characteristic of the invention is that, for transition from the opening operation to the closing operation of the shutter blades, use is made of an engagement release mechanism whose operation is controlled by energizing an electromagnet. By this, the transition can instantaneously be done. Furthermore, because the closing operation of the shutter blades is done by the force of the spring, the opening and closing operation of the shutter can be sped up.

Yet another feature which is characteristic of the invention is that the movement of the drive member for the shutter blades (blade drive plate 8, control disc 110) is converted to pulse form, and this pulse is used in controlling the size of aperture opening of the shutter. Hence, a higher accuracy of exposure control has been achieved.

What is claimed is:

1. A camera having an exposure device for use in image recording which performs a shutter operation by actuation of a shutter release in such a manner that an aperture is varied from a closed state in an opening direction by movement of a shutter member, and then in predetermined timing said aperture is varied in a closing direction, comprising:

(a) a motor;
   (b) an opening mechanism operably responsive to actuation of said shutter release, using said motor as a drive source, for driving said shutter member from the closed state in the opening direction;
   (c) a spring member, charged by an operation of said opening mechanism, for driving said shutter member in the closing direction;
   (d) a change-over mechanism for changing over said shutter member from being driven by said opening mechanism to being driven by said spring member in response to a current supply control of an electromagnet;
   (e) image recording means; and
   (f) control circuit means for causing said shutter member to move a plurality of times continuously upon a single actuation of said shutter release to effect substantially a plurality of cycles of shutter operation in the course of making a single image recording, said control circuit controlling said motor and said electromagnetic a plurality of times, said control means providing for image recording by said image recording means in a selective one of said plurality of cycles of shutter operation.

2. A camera according to claim 1, wherein said change-over mechanism includes a clutch member whose engagement is taken away by the current supply control of said electromagnet, and wherein said clutch member is arranged in a transmission system of said opening mechanism so that when said engagement is taken away by the current supply control of said electromagnet said shutter member is released from a movement in the opening direction and is driven in the closing direction by a spring force of said spring member.

3. A camera according to claim 1, further comprising detecting means for detecting movement of a moving member of said opening mechanism.

4. A camera according to claim 3, wherein said control circuit changes over said shutter member in the closing direction by effecting the current supply control of said electromagnet on the basis of information of said detecting means.

5. A camera according to claim 1, further comprising returning means for returning said opening mechanism to its initial state.

6. A camera according to claim 5, wherein said returning means includes a second spring member charged by driving of said motor, and wherein in synchronism with movement of said shutter member in the closing direction, said opening mechanism returns to the initial state by a spring force of said second spring member.

7. A camera according to claim 5, wherein said returning means includes a circuit for rotating said motor in a direction reverse to that in which said motor is rotated when said shutter member is driven in the opening direction.

8. A camera having an exposure device having an actuatable shutter release for use in image recording and varying an aperture quantity of an aperture by a reciprocating operation of a shutter member, comprising:
   (a) a first drive source;
   (b) an opening mechanism operably responsive to actuation of said shutter release for moving said shutter member in a direction to increase said aperture quantity by said first drive source;
   (c) a second drive source;
   (d) a closing mechanism for moving said shutter member in a direction to decrease said aperture quantity by said second drive source;
   (e) a change-over mechanism for changing over said shutter member from being moved by said opening mechanism to being moved by said closing mechanism;
   (f) a first returning mechanism for returning said opening mechanism to its initial position, said first returning mechanism returning said opening mechanism to the initial position in a timing of changing over in said change-over mechanism;
   (g) image recording means; and
   (h) control means for causing said shutter member to reciprocate continuously upon a single actuation of said shutter release to effect substantially a plurality of cycles of shutter operation in the course of making a single image recording, said control means providing for image recording by said image recording means in a selective one of said plurality of cycles of shutter operation.

9. A camera according to claim 8, wherein said second drive source is a spring member, said spring member being charged by said first drive source.

10. A camera according to claim 9, wherein said first drive source is a motor.

11. A camera according to claim 8, wherein said second drive source also serves as a drive source for returning a member constituting part of said opening mechanism to its initial position.

12. A camera according to claim 8, wherein said control means includes a first circuit for activating said first drive source and a second circuit for activating said change-over mechanism.

13. A camera according to claim 10, wherein said change-over mechanism includes an electromagnet for performing a changing over operation by current supply control.

14. A camera according to claim 13, wherein said control means includes a control circuit for effecting such shutter member reciprocation, said control circuit controlling said motor and said electromagnet a plurality of times.

* * * * *

UNITED STATES PATENT AND TRADEMARK OFFICE
CERTIFICATE OF CORRECTION

PATENT NO. : 5,327,193
DATED : July 5, 1994
INVENTOR(S) : Nobuaki Date, et al.

It is certified that error appears in the above-identified patent and that said Letters Patent is hereby corrected as shown below:

Col. 2, lines 42, 59, delete ","

Col. 9, line 37, change "so much" to --unduly--

Col. 11, line 58, change "24" to --224--

Col. 13, line 26, change "types" to --type--

Col. 13, line 57, change "too much" to --unduly--

Col. 14, line 34, change "electromagnetic" to --electromagnet--

Signed and Sealed this

Eleventh Day of October, 1994

Attest:

BRUCE LEHMAN

Attesting Officer          Commissioner of Patents and Trademarks